United States Patent Office 3,825,444
Patented July 23, 1974

3,825,444
DEVICE FOR SEPARATING ELECTROLYTE CARRIED BY HYDROGEN DURING RECHARGING OF A STORAGE BATTERY
Gilbert Martin, La Seyne-sur-Mer, France, assignor to Etat Francais, Delegation Ministerielle pour l'Armement, Paris, France
Filed July 28, 1972, Ser. No. 275,894
Claims priority, application France, July 30, 1971, 7128007
Int. Cl. H01m 1/02
U.S. Cl. 136—6 P                     6 Claims

ABSTRACT OF THE DISCLOSURE

Apparatus for separating the electrolyte carried by hydrogen during recharging of a storage battery housed in an oil filled box, including a collector tube connected to each storage cell and having an outlet in the upper part of the box and an outlet in the lower part, an oil tank having its upper part connected to the lower part of the oil filled box, a water tank having its lower part connected to the lower part of the oil tank and its upper part communicating with the external environment and a three-way valve which alternately connects the upper end of the collector tube to atmosphere or to a dielectric reservoir.

This invention is directed to a device for separating the electrolyte carried by the hydrogen during the recharge of batteries immersed in a dielectric oil bath.

It is common knowledge the storage batteries fitted in certain submarines and diving apparatuses are housed in boxes located outside the hull and pressurized to the ambient environment pressure. The pressure balance is obtained by filling the compartment with dielectric oil which fills the box and each storage cell on top of the electrolyte.

The pressure of this oil is equivalent to that of the external environment.

At the time these batteries are recharged, the released hydrogen flowing through the dielectric oil carries along electrolyte particles which mix with and contaminate the oil.

The device, according to the invention, is designed to overcome this drawback.

This device, allowing the separation of the electrolyte carried by the hydrogen during the recharge of storage batteries placed in a box filled with balancing oil, consists of a collector made of dielectric material and communicating with the upper part of each storage cell; the collector is provided with at least one port located at the upper part of the box and communicates with the balancing bath. On the other hand, the collector features at least one port, located in the lower part of the box, the latter being isolated from the box interior and blanked off by means of a blanking cap.

During the recharge of the batteries, which takes place when the submarine is on the surface, each upper port of the collector is connected to a three-way cock allowing the collector to be alternately interconnected with the amosphere and with a reservoir filled with dielectric oil.

The blanking caps fitted on the lower ports are then opened so as to enable the contaminated oil and electrolyte found in the collector to be drained into oil collecting vats placed underneath.

Due to the presence of this device, only the small amount of oil on top of the elecrolyte in the storage cells is in contact with the electrolyte, but all the oil in the box is prevented from being contaminated.

At least two hours after recharging has been completed and the evolution of hydrogen has stopped, the balancing cap on the collector lower port is to be closed and the vent piping on the upper ports disconnected. Then the box is topped off with oil so that it flows into the collector through the upper ports and transfers the hydrosatic pressure to the interior of the storage cells.

This invention results in a device allowing the storage batteries placed in a box filled with a pressure balancing bath to be recharged without requiring the box to be drained and avoiding the risk of contaminating the bath by the electrolyte carried by the hydrogen released during the charge.

Figure 1:
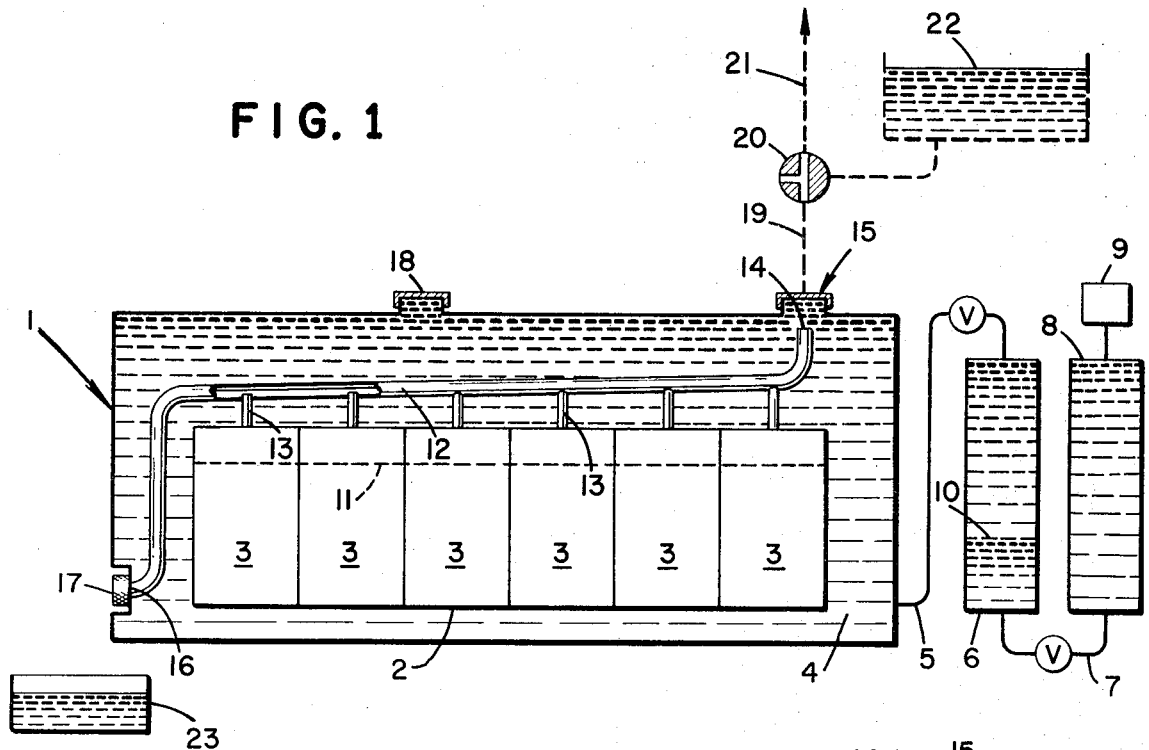
Figure 2:
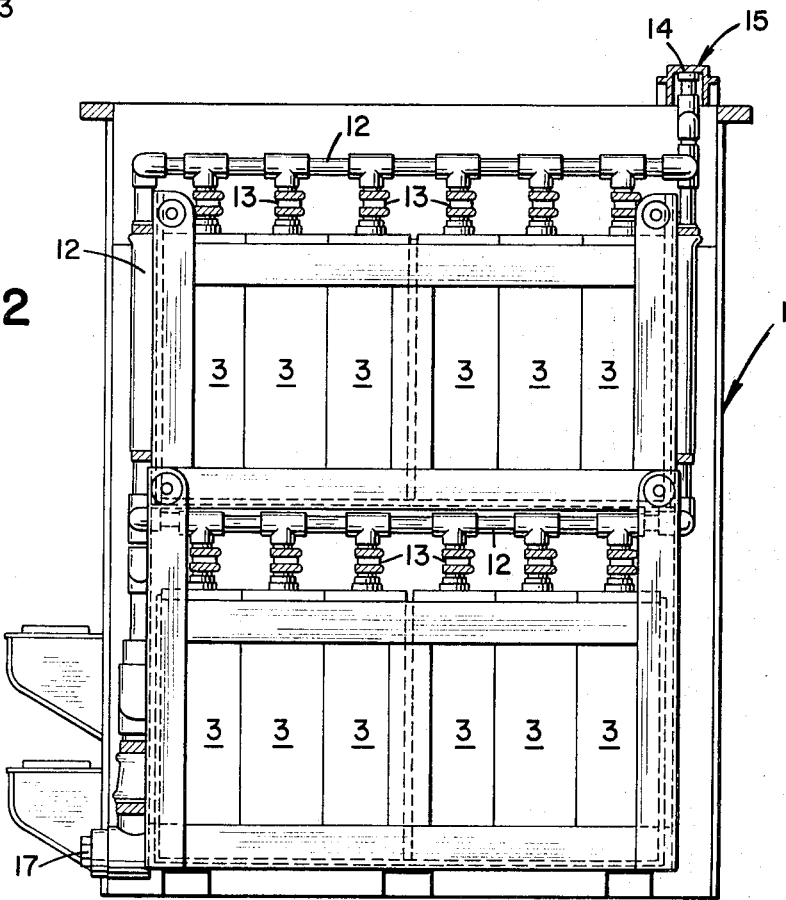

The different characteristics of the invention will be better understood from the following description of a preferred examplary embodiment with reference to the accompanying drawing, in which:

FIG. 1 is a schematic view of a battery fitted with a device according to the invention; and FIG. 2 is a cross-sectional view of the battery.

FIG. 1 represents a sealed box 1 containing a storage battery 2 with six cells 3 visible in the drawing. The box is filled with a dielectric oil bath 4, e.g. oil procurable under the trade name "Mayoline."

By means of piping 5, the interior of box 1 is interconnected with the top of a tank 6 filled at its upper part with the same oil. Via piping 7, the lower part of tank 6 communicates with the lower part of a tank 8 filled with water. The upper part of tank 8 is interconnected through strainer 9 with the ambient environment.

The dash line 10 represents the plane of separation between the oil and the water. Although box 1 is located outside the submarine hull, it is not pressurized because oil 4 is brought to the same pressure as that of the external environment. A collector 12 communicates via tappings 13 with the upper part of each storage cell 3. This collector is made of a dielectric material and provided with one or several upper ports 14 located at the upper part of the box and communicating with bath 4. Sealed plugs 15, located opposite ports 14, allow access to these ports when the submarine is on the surface. The oil 4 enters into each of the cells 3 through unobstructed ports 14 of the collector, where it rises above the electrolyte. Dash line 11 represents the separation plane between the oil and the electrolyte. The pressure of the electrolyte is equal to that of oil 4.

Collector 12 also features at least one lower port 16, located outside the box and closed by means of a sealed blanking cap, e.g. a threaded plug 17. A sealed plug 18 allows box 1 to be filled with oil.

The collector is installed in a slope up position to facilitate draining of the electrolyte through lower port 16 while the hydrogen is evacuated through upper port 14. Also, to prevent the electrolyte circulating in collector 12 from being trapped in the end storage cells which would completely expulse the oil and short the cells, tapping pipes 13 extend slightly into collector 12.

To recharge the batteries when the submarine is on the surface, sealed plug 15 is removed and piping 19 (dash lines in drawing) is connected to upper port 14. This piping is routed to a three-way cock 20 which allows it to be alternately interconnected with vent pipe 21 or with reservoir 22 containing the dielectric oil. The oil collecting vat 23 is placed under lower ports 16 and threaded plug 17 is removed. During the charge and especially after charging is completed, the released hydrogen is evacuated through piping 21 while the electrolyte carried by the hydrogen bubbles flows toward lower port 16.

From time to time reservoir 22 is to be interconnected with collector 12 via cock 20 to flush the collector and to eliminate the electrolyte. The cock is then returned to the vapor relief position.

Once two hours at least have elapsed after charging is completed, collector 12 is thoroughly flushed, lower port 16 is closed, the collector is filled with oil, pipe 19 is disconnected and sealed plug 15 is replaced into position. Box 1 is then completely filled with oil and, if necessary, topped off. When all ports are closed, a water spout is connected to strainer 9 to check the sealing.

FIG. 2 is a cross-sectional drawing of a storage battery according to the invention. Box 1 containing cells 3 on two levels is visible in the drawing along with collector 12 and tapping connections 13 on each cell. The drawing also shows threaded plug 17 which blanks the lower port of collector 12 and upper port 14 located in a housing closed off by sealed plug 15. This housing communicates with the interior of the box. Tanks 6 and 8 are not illustrated.

What is claimed is:

1. Apparatus for separating the electrolyte carried by hydrogen during recharging of a storage battery housed in a box filled with a balancing bath, comprising: a collector tube made of dielectric material connected to the upper part of each storage cell and communicating with the balancing bath through at least one port located in the upper part of the box; and means for eliminating that portion of the balancing bath trapped in said collector tube.

2. The apparatus according to claim 1, wherein said eliminating means comprises at least one collector port located in the lower part of the box, isolated from the interior of said box and closed by a removable blanking cap.

3. The apparatus according to claim 2, further comprising upper ports connected to the storage cells and means venting said upper ports during recharging of the storage battery.

4. The apparatus according to claim 3, further comprising a three-way cock alternately interconnecting said upper ports with the atmosphere and with a reservoir filled with dielectric oil.

5. The apparatus according to claim 4, further comprising an oil tank, means connecting said box with the upper part of said tank and means connecting the lower part of said tank with the external environment to balance the dielectric oil pressure in the box with that of the external environment.

6. The apparatus according to claim 5, further comprising a water tank, means connecting the lower part of said oil tank with the lower part of said water tank, and means communicating the upper part of said water tank with the external environment.

References Cited

UNITED STATES PATENTS

| | | | |
|---|---|---|---|
| 2,930,828 | 3/1960 | Herold | 136—181 |
| 3,166,446 | 1/1965 | Hutchison | 136—6 P |

DONALD L. WALTON, Primary Examiner

U.S. Cl. X.R.

136—166